United States Patent Office 3,228,783
Patented Jan. 11, 1966

3,228,783
SURFACE COATINGS
Joseph L. Betts, Jr., Westfield, and James A. Gallagher, Cranford, N.J., assignors to Esso Research and Engineering Company, a corporation of Delaware
No Drawing. Filed Aug. 17, 1962, Ser. No. 217,550
10 Claims. (Cl. 106—243)

This invention relates to improved liquid diolefin polymers and more particularly relates to the preparation of improved surface coatings therefrom.

Liquid polymers, suitable as surface coatings, may be prepared by polymerizing conjugated diolefins of 4 to 6 carbon atoms either alone or with other monomers copolymerizable therewith, such as for example, the vinyl aromatic hydrocarbons, e.g., styrene or its alkyl substituted derivatives. Sodium polymerization, emulsion polymerization, as well as bulk polymerization in the presence of a diluent, have been used for this purpose with varying degrees of success. Reference may be had to the Arundale et al. patent, U.S. No. 2,586,594, for details of the emulsion polymerization process. However, a particularly suitable process is that described in the patent to Moise, U.S. No. 2,791,618 or the patent to Gleason, U.S. No. 2,762,851.

These liquid polymers are substantially colorless varnishes having viscosities between 0.1 and 25 poises at 50% NVM. The molecular weight is generally below 10,000 Staudinger. While these liquid polymers have met with considerable success as surface coatings, such oils have been deficient in drying properties, requiring prolonged drying exposures where conventional film thickness is used or giving soft films where heavier film thicknesses are used. In thin films the oils can be dried satisfactorily as by baking, but the thickness which can be satisfactorily dried under such conditions has been considerably under that which the coating industry regards as being practical. Heavier films and fat edges have exhibited poor thru-dry properties. Moreover, the hydrocarbon drying oils in most instances have been incompatible with other film-forming materials such as alkyd resins and nitrogen-containing resins. Furthermore, these drying oils have possessed poor pigment-wetting properties, in consequence of which it has been difficult to prepare enamels of the desired gloss and appearance.

Most of these disadvantages of the liquid polymers can be overcome by oxidizing the liquid polymer by blowing with air or oxygen in the presence of a solvent, preferably an aromatic hydrocarbon, and preferably with a catalyst such as a small amount of a metal naphthenate or other drier. However, the oxidized products are relatively expensive and thus not competitive with commercial coating compositions.

It has now been discovered that an economically attractive coating composition that in many cases offers additional advantages in flexibility can be prepared by blending the oxidized polymer with free fatty acids, such as stearic, palmitic, oleic, tall oil fatty acids, lauric, myristic or linoleic or their mixtures. From 5 to 200% by weight based on the liquid polymer oil may be used. It may be desirable to add about 1% alkyl phosphate, e.g., ethyl acid phosphate, to prevent edge wrinkling of the films.

The oxidation of the liquid polymer is best carried out by dissolving the polymer in any aliphatic or aromatic hydrocarbon solvent with which it is compatible and then blowing it with air or oxygen or any other oxygen-containing gas at temperatures between room temperature and 150° C. until 5 to 20% oxygen has been added, depending upon the properties desired. The greater the amount of oxygen introduced, the better the compatibility with oxygenated solvents. For further details of the blowing technique reference may be had to the Tucker et al. patent, No. 2,983,698, the subject matter of which is incorporated herein by reference.

In accordance with the disclosure of this patent oily polymers of butadiene, isoprene, dimethylbutadiene or other conjugated diolefins having 4 to 6 carbon atoms per molecule are prepared by polymerizing any of the aforesaid diolefins alone or copolymerizing them in mixtures with each other or in admixtures with minor amounts of ethylenically unsaturated monomers copolymerizable therewith, e.g. with 5–30% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight-run mineral spirits boiling between 150° and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight-run mineral spirits boiling betwen 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 and 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about $-15°$ and $250°$ C., preferably between $60°$ and $200°$ C., e.g., butane, benzene, xylene, naphtha, cyclohexane, and the like. The diluents are usually used in amounts ranging from 50 to 500 parts per 100 parts of monomer. The reaction temperature may vary between about $40°$ C. and $100°$ C., preferably around $65°$ to $85°$ C. As a catalyst, 0.1 to 10 parts of dispersed metallic sodium is used per 100 parts of monomers, sodium particle sizes below 100 microns being particularly effective.

The blowing of the above polymeric drying oils with air or oxygen is best carried out in a solvent of moderate to good solvency, e.g., solvents or solvent mixtures having a kauri-butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of kauri-butanol value and compatibilty with the various ingredients of the fiinished coating vehicle which is to be formulated.

Examples of suitable solvents include aromatic or mixtures of aromatic and aliphatic hydrocarbons boiling up to about $250°$ C. The aromatic solvent may be benzene, toluene, hemimellitene, pseudocumene, mesitylene, propyl benzene, cymene, ethyl toluene, methyl ethyl benzene, xylenes, Solvesso–100 (a mixture of aromatic hydrocarbons boiling from about $150°$ to $175°$ C.), Solvesso–150 (a mixture of aromatic hydrocarbons boiling from about $190°$ to $210°$ C.) or mixtures thereof. Other suitable solvents include the Varsols which are straight-run mineral spirits boiling in the range of $140°$ to $205°$ C., having API gravities of 40 to 55 and varying in aromatic content from 5 to 35 weight percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxide such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalyst, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace of 5 to 20% or more.

According to this invention, a liquid polymer resulting from the alkali-metal catalyzed polymerization and subsequent oxidation in the manner described is mixed with a free fatty acid derived from natural fats and oils, particularly those having 16 or 18 carbon atoms, e.g., stearic, palmitic, oleic, linoleic, linolenic and their mixtures, such as the mixture derived from tall oil. Other acids having a lower number of carbon atoms can be used, if desired, e.g., myristic and lauric acids. These acids may be used in proportions of 5 to 200% by weight of the liquid polymer. A mixture of the liquid polymer with 40–50 wt. percent of a commercial stearic acid has been found to be particularly stable to heat aging when used as a coating composition for copper magnetic wire. In any case the addition of these cheap, easily available fatty acids to the liquid polymer enables coating compositions to be prepared which are economically competitive with other commercial coating compositions. The dilution with the acids does not detract from the properties of the coatings and in many instances enhances the flexibility on heat aging. Typical commercial stearic acid compositions are shown below:

Table I

|  | A | B | C |
| --- | --- | --- | --- |
| Saturated acids: | | | |
| Myristic | 2.5 | 1.5 | 2.5 |
| Pentadecanoic | 0.5 | 0.5 | 0.5 |
| Palmitic | 47 | 50 | 13 |
| Margaric | 1 | 1 | 1 |
| Stearic | 38 | 47 | 82.5 |
| Unsaturated acids: | | | |
| Oleic | 10 | | 0.5 |
| Linoleic | 1 | | |
| Solubility, wt. percent in xylene at 25° C | 18.7 | 7.4 | 3.9 |
| Solubility, wt. percent in isopropanol at 25° C | 21.8 | 10.7 | 4.3 |

Further improvement in flexibility and impact strength of these blends may be obtained in accordance with a further embodiment of the invention by the addition of 10 to 30% by weight based on the polymer-fatty acid blend of alkyd resins, melamine resins, epoxy resins, phenolic resins, epoxy esters, and vegetable drying oils such as linseed oil, tung oil and the like.

The following specific examples are presented to illustrate typical applications and effects of the present invention. All quantities are expressed in the specification and claims on a weight basis unless otherwise specified.

EXAMPLE 1

Various amounts of a mixture of the commercial stearic acid mixture (A) were added to an airblown copolymer of 80% butadiene and 20% styrene containing about 10% oxygen and prepared in accordance with the method described above. The blends were diluted to 25% solids with Solvesso 100 (an aromatic hydrocarbon fraction boiling 150 to 175° C.). Six inch lengths of No. 18, 40 mil diameter heat-softened wire were dipped in each blend and the resulting coated wire was cured in an air circulating oven at three different time-temperature schedules. The following data (Table II) were obtained:

The data in Table II clearly show that the addition to an oxidized liquid butadiene-styrene copolymer of 40 to 50% by weight of stearic acid based on weight of copolymer makes it possible to prepare a coating composition for magnetic copper wiring which passes the heat aging test and which does not have its rate of cure, initial adhesion or flexibility affected adversely.

EXAMPLE 2

Physical blends in various proportions were prepared of oleic acid with: airblown copolymers of 80 wt. percent butadiene-1,3 and 20% styrene, containing 10% and 16% by weight of oxygen; (Table II–A) alkyd resins; and epoxy resins (Table II–B). Films of each of these blends were laid down on steel Q panels and baked in an air oven. The following results were obtained in Tables II–A and II–B:

*Table II*

| Runs | 1 | 2 | 3 | 4 | 5 | 6 | 7 | 8 |
|---|---|---|---|---|---|---|---|---|
| Percent stearic acid on polymer solids | 1 | 5 | 10 | 20 | 30 | 40 | 50 | 0 |
| Oxidized polymer (50% NVM), pts. by wt | 100 | 100 | 100 | 100 | 100 | 100 | 100 | 100 |
| Stearic acid, N.F., pts. by wt | 0.5 | 2.5 | 5 | 10 | 15 | 20 | 25 | |
| Blend: | | | | | | | | |
| Solids, wt. percent | 50.2 | 51.2 | 52.4 | 54.5 | [1] 56.5 | [1] 50 | [1] 50 | 50 |
| Gardner color | 9 | 9 | 8.5 | 8.5 | 8.5 | 8 | 7.5 | 9 |
| Viscosity, stokes at 25° C | 1.5 | 1.5 | 1.4 | 1.3 | 1.3 | 0.6 | 0.4 | 1.5 |
| Copper wire coating—1 minute at 430° F.: | | | | | | | | |
| Hardness rating [2] | H | M | M | S | H | S | S | S |
| Adhesion, STB [3] | P | P | P | P | P | X | P | P |
| Flexibility [4] | P | P | P | P | P | P | P | P |
| Aged 125° C.[5] | X | X | X | X | X | P | X | X |
| 1 minute at 460° F.: | | | | | | | | |
| Hardness rating [2] | H | H | H | H | H | H | H | S |
| Adhesion, STB [3] | P | P | P | P | P | P | P | P |
| Flexibility [4] | P | P | P | X | P | P | P | P |
| Aged 125° C.[5] | X | X | X | X | X | P | P | X |
| 2 minutes at 460° F.: | | | | | | | | |
| Hardness rating [2] | H | H | H | H | H | H | H | H |
| Adhesion, STB [3] | X | X | X | X | X | X | X | P |
| Flexibility [4] | X | X | X | X | X | X | X | X |
| Aged 125° C.[5] | X | X | X | X | X | X | X | X |

[1] Stearic acid crystallized out on standing. Diluting #7 to 47.1% solids with Solvesso 100 gave a stable blend at room temperature. Blend 5 did not redissolve at room temperature.
[2] Hardness Rating: Soft, Medium, Hard as judged by fingernail indentation into coating.
[3] Adhesion: Coated wire Stretched To Break. Any cracks or breaks in the stretched coating rated failure or "X." "P" denotes pass or no breaks in coating.
[4] Flexibility: Coated wire wrapped once around its own diameter. One crack rated "X" or failure. No cracks rated pass or "P."
[5] Aged 125° C. 3X: Straight and coated wire aged in an air circulating oven at 125° C. for 168 hours. After cooling, wire wrapped around 3 times its own diameter. Rating same as for flexibility.

*Table II–A*

| Runs | 1 | 2 | 3 | 4 | 5 | 6 | 7 | 8 | 9 | 10 | 11 | 12 |
|---|---|---|---|---|---|---|---|---|---|---|---|---|
| Polymer, 60% in Varsol | 40 | 40 | 40 | 40 | | | | | | | | |
| Oleic acid, percent on polymer | 0 | 10 | 50 | 100 | 0 | 50 | 75 | 100 | 0 | 50 | 100 | 150 |
| Airblown polymer (10% O₂), 50% NVM in Solvesso 100 | | | | | 40 | 40 | 40 | 40 | | | | |
| Airblown polymer (16% O₂), 45% NVM in xylene | | | | | | | | | 44.5 | 44.5 | 44.5 | 33.3 |
| Oleic acid, gms | 0 | 2.4 | 12 | 24 | 0 | 10 | 15 | 20 | 0 | 10 | 20 | 22.5 |
| Solvesso 100 | 0 | 1.6 | 8 | 16 | 0 | 10 | 15 | 20 | 0 | 12.2 | 24.4 | 27.6 |
| Solids, wt. percent | 60 | 60 | 60 | 60 | 50 | 50 | 50 | 50 | 45 | 45 | 45 | 45 |
| Baked 15 min. at 350° F.[1]: | | | | | | | | | | | | |
| Thickness, mil | 1.0 | 0.9 | | | 0.9 | 0.8 | 0.6 | 0.7 | 0.9 | 0.7 | 0.7 | 0.7 |
| Hardness, pencil | B | H | | | H | 2H | H | H | 2H | 3H | 3H | 2H |
| Observation | G | GH | SC | SC | G | G | G | GB | GE | G | G | GB |

[1] No. 40 rod drawdown on steel Q panels:
SC—Severe crawling.
G—Good continuous film.
B—Some beading at edge of panel.
E—Some eyeholing throughout film.
H—Hazy film suggesting incompatibility.

Table II-B

| Runs | 13 | 14 | 15 | 16 |
|---|---|---|---|---|
| Solvesso 100 | 10 | 10 | 10 | 30 |
| Solids, wt. percent | 50 | 50 | 50 | 50 |
| Oleic acid, percent on solids | 50 | 50 | 50 | 50 |
| 40% phthalic castor alkyd, 50% in xylene | 40 | | | |
| 34% phthalic linseed alkyd, 50% in mineral spirits | | 40 | | |
| 30% phthalic soya alkyd, 50% in mineral spirits | | | 40 | |
| 160 poise epoxy, 100% | | | | 20 |
| Baked 30 min. at 300° F.:[1] | | | | |
| Thickness, mil | 0.5 | 0.6 | 0.8 | |
| Hardness, pencil | H | F | F | |
| Observation | G | G | H | SC |

[1] No. 40 rod drawdown on steel Q panels:
SC—Severe crawling.
G—Good continuous film.
B—Some beading at edge of panel.
H—Hazy film suggesting incompatibility.

The above data show that blends of oleic acid and the airblown polymer give baked films having properties very similar to the airblown polymer containing no oleic acid. This represents an important economic advantage for the blends. The baked coatings of oleic acid with alkyd resins and epoxy resins cured much more slowly than the blends with the airblown polymer, e.g., runs 6 and 10 of Table II-A and 13, 14 and 15 of Table II-B. The soya phthalic alkyd developed a haze and the blend with the epoxy resin exhibited severe crawling. Since films from equal quantities of oleic acid and the airblown polymer exhibited slight beading along the edge of the panel, the more desirable proportion of oleic acid and airblown polymer should be between 75 and 100 wt. percent oleic acid.

EXAMPLE 3

An airblown copolymer of 80% by weight of butadiene-1,3 and 20% styrene containing 10% by weight of oxygen was blended with various proportions of tall oil fatty acids having the following composition.

| | |
|---|---|
| Acid value (mg. KOH/g.) | 191 |
| Saponification value (mg. KOH/g.) | 195 |
| Iodine value (Wijs) (grams of $I_2$/100 g.) | 135 |
| Composition, wt. percent: | |
| Moisture | <0.1 |
| Ash | <0.001 |
| Rosin acids | 4 |
| Unsaponifiables | 4 |
| Fatty acids, total wt. percent | 92.0 |
| Fatty acid composition, wt. percent: | |
| Linoleic, conjugated | 8.0 |
| Linoleic, non-conjugated | 36.0 |
| Oleic | 50.0 |
| Saturated | 6.0 |
| Specific gravity, 25/25° C. | 0.9065 |
| Pounds per gallon, 25° C. | 7.54 |
| Viscosity, Gardner, 25° C. | A |
| Viscosity, Stokes, 25° C. | 0.5 |
| Viscosity, SUS, 100° F. | 100 |
| Color, Gardner | 8 |
| Flash point, open cup, °F. | 380 |

Films from these blends were laid down on steel Q panels and baked. The following results were obtained:

Table III

| Runs | 1 | 2 | 3 | 4 | 5 | 6 | 7 |
|---|---|---|---|---|---|---|---|
| Fatty acids, percent on polymer | 0 | 25 | 50 | 75 | 100 | 150 | ---- |
| Airblown polymer (10% $O_2$) | 100 | 40 | 40 | 40 | 40 | 40 | ---- |
| Tall oil fatty acid | 0 | 5 | 10 | 15 | 20 | 30 | 100 |
| Solids, wt. percent | 50 | 55.5 | 60 | 63.6 | 66.7 | 71.4 | 100 |
| Gardner color | 7 | 7 | 7.5 | 7.5 | 7.5 | 8 | 8 |
| Viscosity, stokes at 25° C. | 2.0 | 1.9 | 1.7 | 1.5 | 1.3 | 0.9 | 0.3 |
| Baked 15 min. at 350° F.[1] | | | | | | | |
| Thickness, mils | 1.0 | 1.0 | 1.0 | 1.0 | 1.0 | 1.1 | ---- |
| Hardness, pencil | 2H | 3H | H | H | H | F | ---- |
| Impact, direct | 40 | 40 | 20 | 40 | 40 | 40 | ---- |
| Impact, reverse | <10 | <10 | <10 | <10 | <10 | <10 | ---- |
| Observation | G | G | G | G | GM | GM | ---- |
| Baked 30 min. at 350° F.[1] | | | | | | | |
| Thickness, mil | 1.0 | 1.0 | 1.0 | 0.9 | 1.0 | .9-1.5 | ---- |
| Hardness, pencil | 2H | 4H | 2H | 4H | 2H | H | ---- |
| Impact, direct | 40 | 40 | 40 | 60 | 40 | 40 | ---- |
| Impact, reverse | 10 | 10 | 10 | 20 | <10 | <10 | ---- |
| 4 hours xylene [2] | 2 | 2 | 1 | 1 | 2 | 3 | ---- |
| 64 hours water [2] | 2 | 1 | 3 | 3 | 4 | 4 | ---- |
| Observation | G | G | G | G | GM | GM | ---- |

[1] No. 40 rod drawdown on steel Q panels:
G—Good continuous film.
M—Light and dark marbleizing within continuous film.
[2] An arbitrary scale in which 0 represents no effect and 4 represents total failure.

The above data show that films having good baked properties can be prepared from blends of airblown butadiene-styrene copolymers containing 10% oxygen with 75 to 100 wt. percent of tall oil fatty acid. Above 100% there is light/dark variation in the baked film. Xylene and water resistance tests indicate that the marblelike pattern results in undesirable properties.

EXAMPLE 4

Blends were prepared from 44.4 wt. percent of an airblown copolymer of 80% butadiene-1,3 and 20% styrene containing about 16 wt. percent oxygen and 55.6% tall oil fatty acids having the following composition:

| | |
|---|---|
| Acid value (mg. KOH/g.) | 194 |
| Saponification value (mg. KOH/g.) | 196 |
| Iodine value (Wijs) (grams of $I_2$/100 g.) | 131 |
| Composition, wt. percent: | |
| Moisture | <0.1 |
| Ash | <0.001 |
| Rosin acids | 3.8 |
| Unsaponifiables | 1.3 |
| Fatty acids, total wt. percent | 94.9 |
| Fatty acid composition, wt. percent: | |
| Linoleic, conjugated | 7.4 |
| Linoleic, non-conjugated | 36.3 |
| Oleic | 52.2 |
| Saturated | 4.0 |
| Specific gravity, 25/25° C. | 0.9059 |
| Pounds per gallon, 25° C. | 7.53 |
| Viscosity, Gardner, 25° C. | A |
| Viscosity, stokes, 25° C. | 0.5 |
| Viscosity, SUS, 100° F. | 100 |
| Color, Gardner | 4+ |
| Flash point, open cup, ° F. | 380 |

Films were laid down on steel panels and baked for 30 minutes at 300 and 350° F. and 60 minutes at 300° F. and evaluated for flexibility and chemical resistance. The following results were obtained, showing the properties of the films as originally laid down and after aging 14 days.

*Table IV-A.—Physical properties of baked films*

| Runs | Coating | | Original properties | | | | | |
|---|---|---|---|---|---|---|---|---|
| | Composition | Pigment, PVC [1] | Baked, min./°F | Thickness, mils | Hardness, pencil | Impact, inch-lbs. | | Gloss, 60° |
| | | | | | | Direct | Reverse | |
| 1 | Polymer plus fatty acids [2] | Clear | 30/300 | 1.5 | F | 20 | <5 | |
| 2 | ...do... | ...do... | 60/300 | 0.9 | 6H | 20 | <5 | |
| 3 | Polymer alone | ...do... | 30/300 | 0.8 | 2H | 10 | <5 | |
| 4 | ...do... | ...do... | 60/300 | 1.1 | 5H | 10 | <5 | |
| 5 | Polymer plus fatty acids | Enamel, 15% | 30/300 | 2.0 | 2B | 40 | 5 | 83 |
| 6 | ...do... | ...do... | 60/300 | 2.3 | 2H | 40 | <5 | 75 |
| 7 | Polymer alone | ...do... | 30/300 | 1.4 | 2H | 80 | <5 | 95 |
| 8 | ...do... | ...do... | 60/300 | 1.3 | 3H | 60 | 20 | 93 |
| 9 | Polymer plus fatty acids | Primer, 40% | 30/300 | 1.7 | 5H | 140 | 40 | |
| 10 | ...do... | ...do... | 30/350 | 1.3 | 5H | 100 | 10 | |
| 11 | Polymer alone | ...do... | 30/300 | 1.7 | 5H | >160 | 40 | |
| 12 | ...do... | ...do... | 30/350 | 1.5 | 6H | >160 | 60 | |
| 13 | Polymer plus fatty acids [2] [3] | Clear | 60/300 | 2.4 | B | 20 | <5 | 81 |
| 14 | Polymer alone [3] | ...do... | 60/300 | 2.1 | 2H | 10 | <5 | 92 |
| 15 | Polymer plus fatty acids [3] | Enamel, 15% | 60/300 | 1.8 | 5H | 20 | <5 | 70 |
| 16 | Polymer alone [3] | ...do... | 60/300 | 2.3 | 5H | 20 | <5 | 91 |

[1] Pigment volume concentration.
[2] Clear blend only contains 1% ethyl acid phosphate on total solids to prevent edge wrinkling and marble coloration.
[3] Bonderized panels spray coated with commercial resin-tall oil epoxy ester primer and baked 30 minutes at 350° F. The 0.8 to 1.1 mil primed panel top coated and again baked as shown.

*Table IV-B.—Physical properties of baked films*

| Runs | Coatings aged 14 days at 140° F. | | | | | Flexibility, 180° bend, inch |
|---|---|---|---|---|---|---|
| | Thickness, mils | Hardness, pencil | Impact, inch-lbs. | | Gloss, 60° | |
| | | | Direct | Reverse | | |
| 1 | 1.1 | 3H | 20 | >5 | | >¾ |
| 2 | 0.9 | 5H | 20 | >5 | | >¾ |
| 3 | 0.8 | 5H | 10 | >5 | | >¾ |
| 4 | 1.3 | 4H | 10 | >5 | | >¾ |
| 5 | 2.0 | 3H | 10 | >5 | 87 | >¾ |
| 6 | 2.3 | 3H | 20 | >5 | 75 | >¾ |
| 7 | 1.4 | 5H | 10 | >5 | 93 | >¾ |
| 8 | 1.4 | 6H | 20 | >5 | 94 | >¾ |
| 9 | 1.8 | 7H | 60 | >5 | | |
| 10 | 1.3 | 7H | 80 | 10 | | ¼ |
| 11 | 1.7 | 7H | 100 | 20 | | ¼ |
| 12 | 1.5 | 7H | 120 | 40 | | ⅓ |
| 13 | 2.2 | H | 20 | >5 | 86 | ¾ |
| 14 | 2.0 | 2H | 20 | >5 | 91 | >¾ |
| 15 | 1.8 | 6H | 20 | >5 | 75 | |
| 16 | 2.4 | 5H | 20 | >5 | 88 | |

EXAMPLE 5

The following charge was introduced into a 500 ml. flask fitted with a reflux condenser.

| | Parts by weight |
|---|---|
| Airblown polymer, 50% NVM (containing about 10% $O_2$) | 140 |
| Tall oil fatty acid mixture (of Example 3) | 70 |
| Solvesso 100 | 45.5 |
| p-Toluene sulfonic acid | 0.1 |

This mixture was heated for eight hours at an initial temperature of 146° C. and a final temperature of 174° C. An esterified product was obtained having a Gardner color above 18 and a viscosity at 25° C. of 1.25 strokes. A similar esterified product was also prepared from commercial stearic acid (A).

Films from each of these esterified products were laid down on steel Q panels and baked for 15 and 30 minutes at 350° F. The following data were obtained:

| Fatty acid | Oleic | Tall oil |
|---|---|---|
| Percent on polymer | 100 | 100 |
| Solids, wt. percent | 50 | 58.9 |
| Baked 15 min. at 350° F.: | | |
| Thickness, mil | 0.8 | 1.0 |
| Hardness, pencil | H | H |
| Baked 30 min. at 350° F.: | | |
| Thickness, mil | 0.7 | 0.9 |
| Hardness, pencil | 2H | 2H |
| Impact, direct | 40 | 40 |
| Impact, reverse | >10 | >10 |
| 4 hours xylene [1] | 2 | 3 |
| 65 hours water [1] | 2 | 2 |

[1] Impacted panels partially submerged in xylene for 4 hours, then checked for ease of coating removal by thumbnail. Panels water-washed and partially submerged in water for 65 hours and again checked for ease of coating removal. Rating of 1—best to 4—poor is relative. Rating 1 and 2 indicates a small amount of the coating could be forced off with difficulty.

*Table V.—Chemical resistance tests of baked films*

| Runs | One hour exposure to —[1] | | | Seven hours exposure to —[1] | | | | |
|---|---|---|---|---|---|---|---|---|
| | 1% NaOH | MEK | Xylene | Dist. water | Grease [2] | Soap | Varsol | 10% HCl |
| 1 | S(S) | S(S) | S(S) | P | P | S(P) | S(P) | P. |
| 2 | S(S) | S(S) | S(P) | P | P | P(P) | P(P) | P. |
| 3 | S(P) | S(S) | S(P) | P | P | P(P) | S(P) | P. |
| 4 | S(P) | S(S) | S(P) | P | P | P(P) | P(P) | P. |
| 5 | S(S) | S(S) | S(S) | S(P) | S(S) | S(S) | S(S) | P. |
| 6 | S(S) | S(S) | S(S) | P(P) | P(P) | P(S) | S(P) | P. |
| 7 | S P | S(S) | S(P) | S(P) | S(P) | S(P) | S(S) | P. |
| 8 | S P | S(S) | S(P) | P(P) | P(P) | P(P) | P(P) | P. |
| 9 | S(S) | S(S) | S(P) | P | P | S(S) | S(P) | S(S). |
| 10 | P(P) | S(P) | S(P) | P | P | P(P) | P(P) | S(S). |
| 11 | P(P) | S(S) | S(P) | P | P | P(P) | S(P) | S(S). |
| 12 | P(P) | S(S) | P(P) | P | P | P(P) | P(P) | P(P). |

[1] Spot tests: Chemicals applied to filter paper on panel and covered with a watch glass. HCl tested by applying acid direct to coating without filter paper and covering. Moistened flat side of Ivory soap placed in direct contact with coating, not covered. At the end of test period coating tested for ease of removal with thumbnail. Rating "S" indicates coating had been softened and could be removed. Rating "P" indicates coating could not be removed. Rating in parentheses were obtained on panels aged 2 weeks at 140° F.
[2] 50/50 Crisco/oleic acid.

The above data indicate that satisfactory coatings can be prepared by pre-esterifying the airblown polymer with free fatty acids rather than physically blending the acids with the polymer.

EXAMPLE 6

Films were laid down on steel Q panels from an airblown copolymer of 80% butadiene-1,3 and 20% styrene, and its blends with tall oil fatty acids and alkyd resins. The following data were obtained:

| Runs | 1 | 2 | 3 | 4 | 5 |
|---|---|---|---|---|---|
| Airblown polymer, 45% NVM parts by weight | 48 | 48 | 36 | | |
| Airblown polymer plus 125% tall oil fatty acids, 64.8% NVM parts by weight | | | | 33.3 | 25 |
| Soya alkyd resin, 50% NVM parts by weight | | | 10.8 | | 10.8 |
| Phenyl acid phosphate, 25% parts by weight | | 0.15 | 0.15 | 0.15 | 0.15 |
| Cure 60 min./300° F. on steel: | | | | | |
| Thickness, mil | 0.9 | 0.9 | 0.9 | 1.0 | 0.85 |
| Hardness, pencil | 5H | 5H | 5H | H | 2H |
| Impact: | | | | | |
| Direct | 10 | 10 | 20 | 20 | 40 |
| Reverse | <5 | <5 | <5 | <5 | <5 |
| 180° bend, inch | >¾ | ⅜ | ⅛ | >¾ | ⅛ |
| Cure 30 min./350° F. on steel: | | | | | |
| Thickness, mil | 1.0 | 0.9 | 0.8 | 0.85 | 0.9 |
| Hardness, pencil | 6H | 4H | 5H | 4H | 3H |
| Impact: | | | | | |
| Direct | 20 | 20 | 40 | 20 | 60 |
| Reverse | <5 | <5 | 20 | <5 | 40 |
| 180° bend, inch | ⅛ | ³⁄₁₆ | ⅛ | >½ | ⅛ |

The above data show that the addition of a soya alkyd resin improves the impact and flexibility of cured films of blends of airblown polymers with tall oil fatty acids.

EXAMPLE 7

The following blends were prepared from various amounts of an airblown polymer of 80 wt. percent butadiene-1,3 and 20% styrene containing 16% oxygen, and raw linseed oil.

| Blend, parts by wt | 1 | 2 | 3 | 4 |
|---|---|---|---|---|
| Airblown polymer, 45% NVM | 44.4 | 44.4 | 3.2 | 44.4 |
| Raw linseed oil | 10.0 | 25.0 | 87.5 | |
| Tall oil fatty acids (composition of Example 4) | | | | 25.0 |

Films of these blends were laid down on steel D panels and baked for 30 minutes at 300 and 350° F. These baked films were compared with those containing the tall oil fatty acids in Example 4. The following data were obtained:

| Blend No. | 1 | 2 | 3 | 4 |
|---|---|---|---|---|
| 30 min., 300° F.: | | | | |
| Thickness, mil | 0.8 | 0.9 | | 0.8 |
| Hardness, pencil | HB | 6B | | B |
| Appearance | (1) | (2) | (3) | (4) |
| 30 min., 350° F.: | | | | |
| Thickness, mil | 0.8 | 1.0 | | 0.8 |
| Hardness, pencil | H | B | | 2H |
| Appearance | (1) | (2) | (3) | (4) |

¹ Eyeholes non-uniform.
² Not compatible.
³ Tacky not cured.
⁴ Continuous film—OK.

The above data show that natural drying oils, although containing a small amount of free fatty acids are not the equivalent of free fatty acids. The films in which linseed oil is used in place of the free fatty acids are non-uniform, not cured or incompatible, while the film (blend 4) containing the tall oil fatty acids forms continuous eyehole-free films.

The nature of the present invention having been thus fully set forth, what is claimed as new and useful and desired to be secured by Letters Patent is:

1. A coating composition consisting essentially of blends of (1) liquid airblown polymers chosen from the group consisting of homopolymers of diolefins of 4 to 6 carbon atoms and copolymers of said diolefins with 5–30 wt. percent of styrene, said air blown polymer containing 5 to 20 wt. percent oxygen and (2) 5 to 200% free fatty acids based on airblown polymer derived from natural fats and oils.

2. The composition of claim 1 in which the fatty acid is commercial stearic acid.

3. The composition of claim 1 in which the fatty acid is oleic acid.

4. The composition of claim 1 in which the fatty acid is tall oil fatty acid.

5. The composition of claim 4 in which the polymer is a copolymer of 80 wt. percent butadiene-1,3 and 20% styrene which has been airblown to contain 10% oxygen and the fatty acid is present in amounts of 75 to 100% by weight.

6. The composition of claim 4 in which the polymer is an airblown copolymer of 80% by weight of butadiene-1,3 and 20% styrene which has been airblown to contain 16% by weight of oxygen and in which the polymer and fatty acids are present in proportions of 44.4 wt. percent of airblown polymer to 55.6% of fatty acid.

7. The composition of claim 5 which contains 1% ethyl acid phosphate.

8. The composition of claim 6 which contains 1% ethyl acid phosphate.

9. The composition of claim 6 which contains 10–30% by weight, based on polymer-fatty acid mixture, of an alkyd resin.

10. The composition of claim 9 which contains about 1% of phenyl acid phosphate.

References Cited by the Examiner

UNITED STATES PATENTS

| 2,638,460 | 5/1953 | Crouch | 106—285 |
| 2,836,508 | 5/1958 | Canniff et al. | 106—285 |
| 2,917,391 | 12/1959 | Canniff et al. | 106—285 |
| 3,058,837 | 10/1962 | Winters et al. | 106—285 |

ALEXANDER H. BRODMERKEL, *Primary Examiner.*

MORRIS LIEBMAN, *Examiner.*